(12) United States Patent
Connelly et al.

(10) Patent No.: US 7,678,168 B2
(45) Date of Patent: Mar. 16, 2010

(54) MULTIPLE URETHANE TUNED EXHAUST DAMPER FOR VERTICAL EXHAUST

(75) Inventors: William R. Connelly, Kirkland, WA (US); John Thomas Auxter, Circleville, OH (US); Jin Choi, Seattle, WA (US); Reid R. Nabarrete, Kent, WA (US); Michikazu Jody Tao, Maple Valley, WA (US)

(73) Assignee: PACCAR Inc., Bellevue, WA (US)

( * ) Notice: Subject to any disclaimer, the term of this patent is extended or adjusted under 35 U.S.C. 154(b) by 397 days.

(21) Appl. No.: 11/610,929

(22) Filed: Dec. 14, 2006

(65) Prior Publication Data

US 2008/0142647 A1 Jun. 19, 2008

(51) Int. Cl.
*B01D 50/00* (2006.01)
*B60K 1/00* (2006.01)

(52) U.S. Cl. ........... 55/385.3; 55/DIG. 28; 55/DIG. 30; 248/55; 248/58; 248/60; 248/62; 180/89.2; 180/309; 267/152; 267/165

(58) Field of Classification Search ................ 55/385.3, 55/DIG. 28, DIG. 30; 248/55, 58, 62, 60; 180/309, 89.2; 267/152, 165
See application file for complete search history.

(56) References Cited

U.S. PATENT DOCUMENTS

| 2,227,306 | A |   | 12/1940 | Guy |
|---|---|---|---|---|
| 2,389,562 | A |   | 11/1945 | Storch |
| 3,155,361 | A |   | 11/1964 | Balan |
| 4,157,902 | A | * | 6/1979 | Tokar ......................... 55/385.3 |
| 4,208,197 | A | * | 6/1980 | Yakimowich et al. .......... 55/315 |
| 4,209,155 | A | * | 6/1980 | Florian ......................... 248/62 |
| 4,366,878 | A | * | 1/1983 | Warf .......................... 180/68.3 |
| 4,871,181 | A | * | 10/1989 | Usher et al. .................. 277/627 |
| 5,197,698 | A | * | 3/1993 | Bartholomew ................ 248/60 |
| 5,328,209 | A | * | 7/1994 | Cromwell ....................... 285/1 |
| 5,445,241 | A |   | 8/1995 | Nakamura |
| 5,649,685 | A |   | 7/1997 | Keller |
| 5,873,429 | A |   | 2/1999 | Qutub |
| 5,908,187 | A |   | 6/1999 | Kalkoske |
| 6,095,460 | A |   | 8/2000 | Mercer |
| 6,379,410 | B1 | * | 4/2002 | Dudley ....................... 55/385.3 |
| 6,695,295 | B2 |   | 2/2004 | Williams |
| 6,758,300 | B2 |   | 7/2004 | Kromis |
| 7,207,527 | B2 | * | 4/2007 | Opperthauser ............... 248/55 |
| 7,501,005 | B2 | * | 3/2009 | Thaler .......................... 55/523 |
| 2005/0253317 | A1 |   | 11/2005 | Yasumoto |
| 2007/0169981 | A1 | * | 7/2007 | Connelly ..................... 180/309 |

FOREIGN PATENT DOCUMENTS

| JP |    7-71249 A | 3/1995 |
|---|---|---|
| JP |   8-319825 A | 12/1996 |
| JP | 2004239226 A | 8/2004 |

* cited by examiner

*Primary Examiner*—Duane Smith
*Assistant Examiner*—Minh-Chau T Pham
(74) *Attorney, Agent, or Firm*—Christensen O'Connor Johnson Kindness PLLC (57) ABSTRACT

The present disclosure provides an exhaust system support assembly (10) for coupling an exhaust member (F) to a vehicle (A). The exhaust system support assembly (10) includes an exhaust member mount assembly (52) couplable to the exhaust member (F), an isolation pin (32) received within at least a portion of the exhaust member mount assembly (52), and at least one resilient member (44,46) disposed between the exhaust member mount assembly (52) and the isolation pin (32). The exhaust system support assembly (10) further includes a pivot assembly (16) couplable to the vehicle (A), wherein the pivot assembly (16) slidably and rotatably receives the isolation pin (32).

28 Claims, 6 Drawing Sheets

MULTIPLE URETHANE TUNED EXHAUST DAMPER FOR VERTICAL EXHAUST

BACKGROUND

Semi-trailer trucks typically include at least one vertical exhaust stack positioned rear of the truck cab or alongside the truck cab. The vertical exhaust stack is normally secured to the truck by an exhaust system support assembly, which secures the exhaust pipe of the exhaust stack to the surface of the truck cab. Other portions of the exhaust system are attached to the frame of the vehicle. Because the truck cab is moveably suspended upon the frame of the vehicle, when the semi-trailer truck is in motion, there is necessarily movement between the exhaust stack and the cab. An inefficient exhaust system support assembly results in the motion of the cab being restricted at the extreme positions of cab movement during jounce and rebound. This restriction can cause the exhaust system support assembly to be torn away from the truck cab when the truck cab moves independently of the exhaust stack. Moreover, when the vibration from the truck cab transmits directly to the exhaust stack connection, the connection can loosen and fail over time.

Operators of semi-trailer trucks would find desirable an exhaust system support assembly that allows the truck cab and exhaust stack to move independently during jounce and rebound, that reduces vibration and noise generated by the moving components of the assembly, and that is durable and long-lasting.

SUMMARY

The present disclosure provides an exhaust system support assembly for coupling an exhaust member to a vehicle. The exhaust system support assembly includes an exhaust member mount assembly couplable to the exhaust member, an isolation pin received within at least a portion of the exhaust member mount assembly, and at least one resilient member disposed between the exhaust member mount assembly and the isolation pin. The exhaust system support assembly further includes a pivot assembly couplable to the vehicle, wherein the pivot assembly slidably and rotatably receives the isolation pin.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
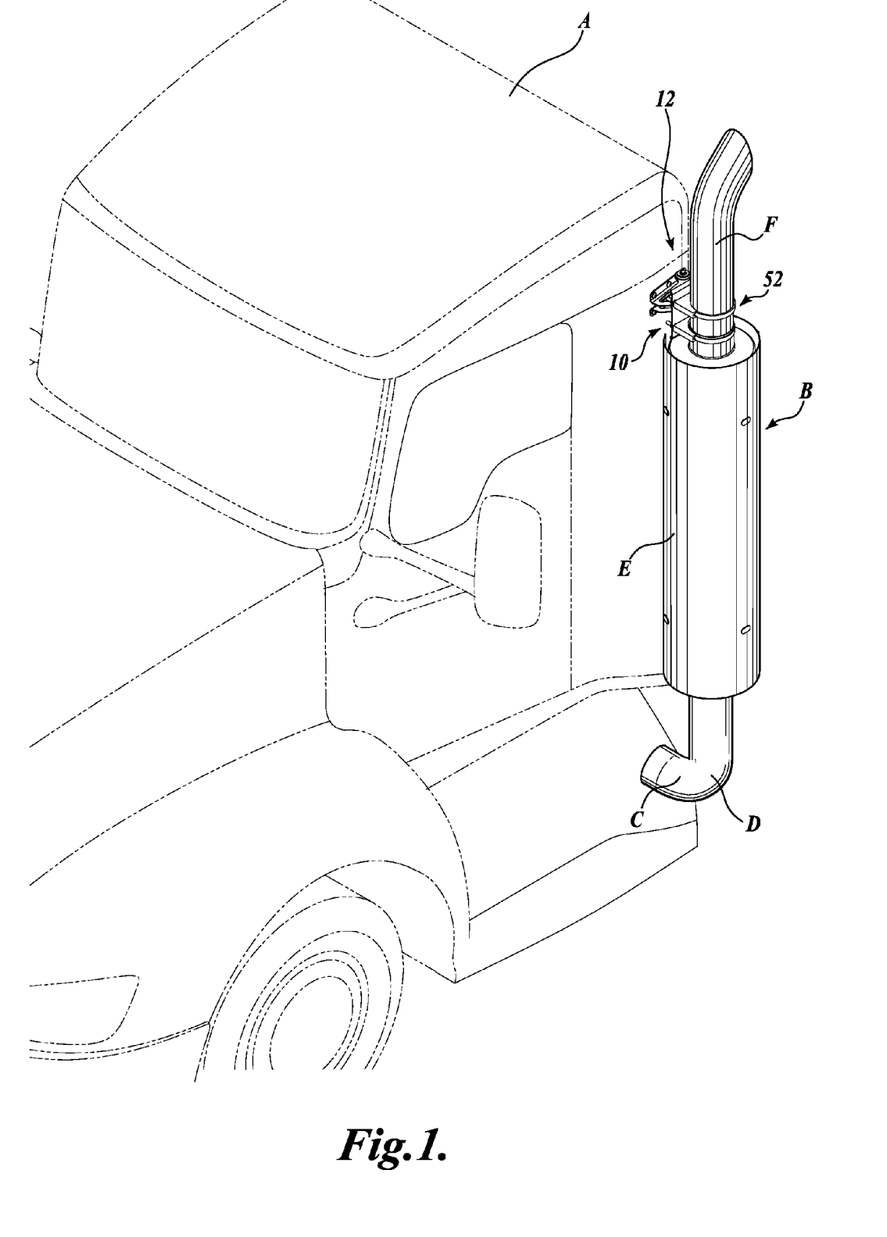
FIG. 1 is an environmental view of a representative embodiment of an exhaust damper constructed in accordance with one embodiment of the present disclosure, wherein the exhaust damper couples a vertical exhaust system to a vehicle cab.

An exhaust system support assembly, or exhaust damper 10 constructed in accordance with one embodiment of the present disclosure is best seen by referring to FIG. 1. The exhaust damper 10 is shown in combination with the cab of a motor vehicle, and specifically a truck cab A of a semi-trailer truck, having a vertical exhaust system B. The vertical exhaust system B includes an engine exhaust pipe C positioned below the truck cab A and above and coupled to the truck frame (not shown). One end of the engine exhaust pipe C is coupled to one end of an exhaust pipe elbow D. A vertically oriented muffler E is positioned above and coupled to the other end of the exhaust pipe elbow D. An exhaust stack F, which is a cylindrical outlet port for gases exiting the muffler E, is positioned above and coupled to the opposite end of the muffler E. The exhaust muffler E and exhaust stack F may be positioned in a vertical orientation rear of the truck cab A or alongside the truck cab A. For ease of illustration and clarity, the exhaust damper 10 is shown only in combination with the vertical exhaust system B; however, it should be appreciated that the exhaust damper 10 may be used with other vertical or horizontal exhaust systems.

Figure 2:
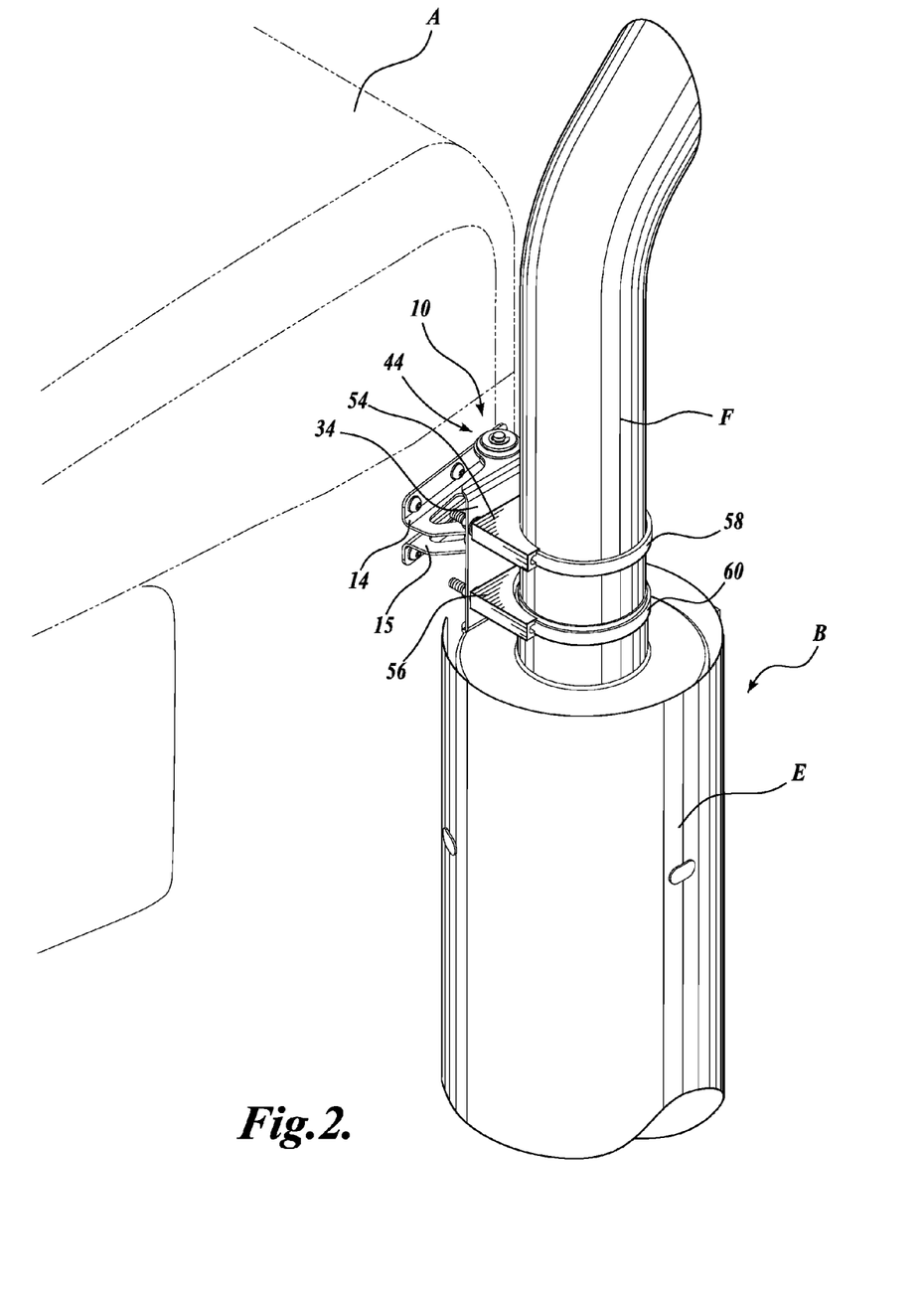
FIG. 2 is an enlarged isometric view of the exhaust damper of FIG. 1 coupling the vertical exhaust system to the vehicle cab.
Figure 3:
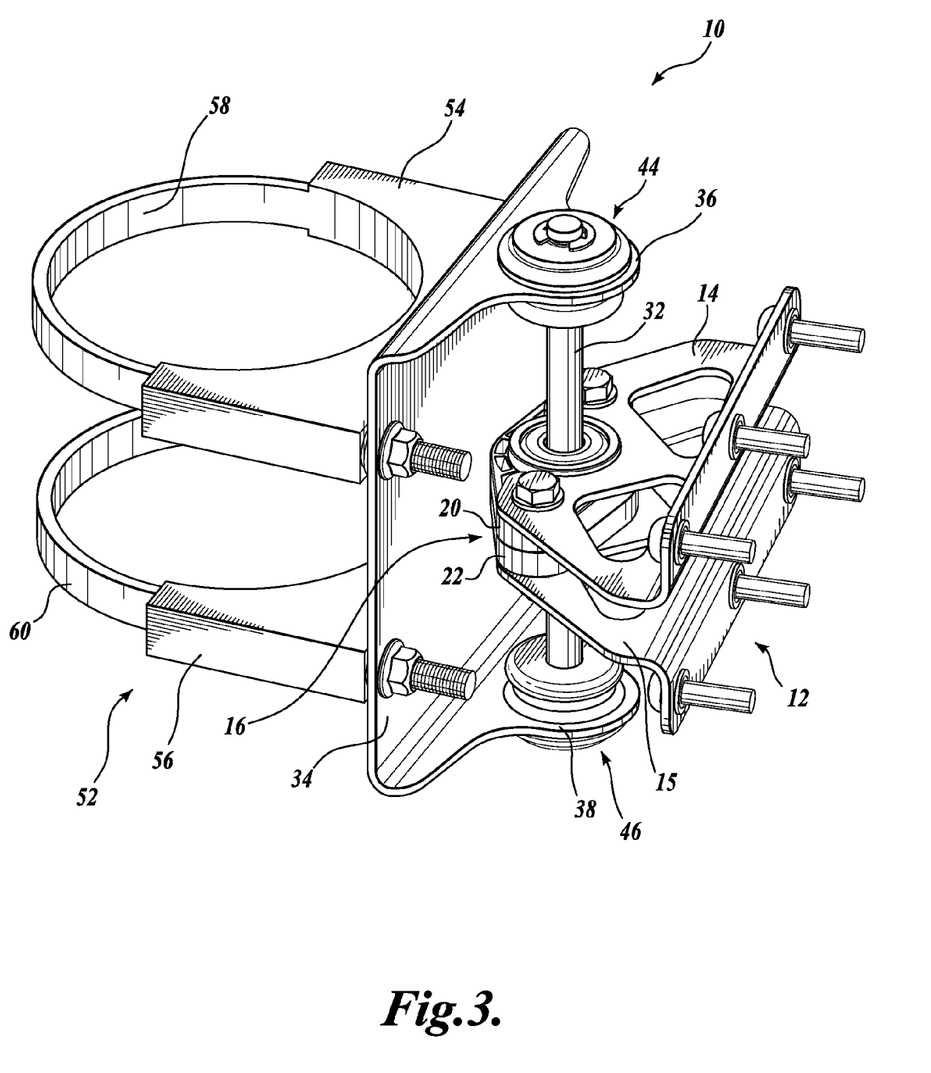
FIG. 3 is an isometric view of an exhaust damper for a vehicle exhaust system.

Exhaust stack F is coupled to the truck cab A using the exhaust damper 10. Referring to FIGS. 2 and 3, the exhaust damper 10 includes a vehicle mount assembly 12 for coupling the exhaust damper 10 to the vehicle cab A, and an exhaust member mount assembly 52 for coupling the exhaust damper 10 to the exhaust stack F. An isolation pin 32 passes through the vehicle mount assembly 12 and the exhaust member mount assembly 52 to indirectly coupled the vehicle cab A to the exhaust stack F.

Figure 4:
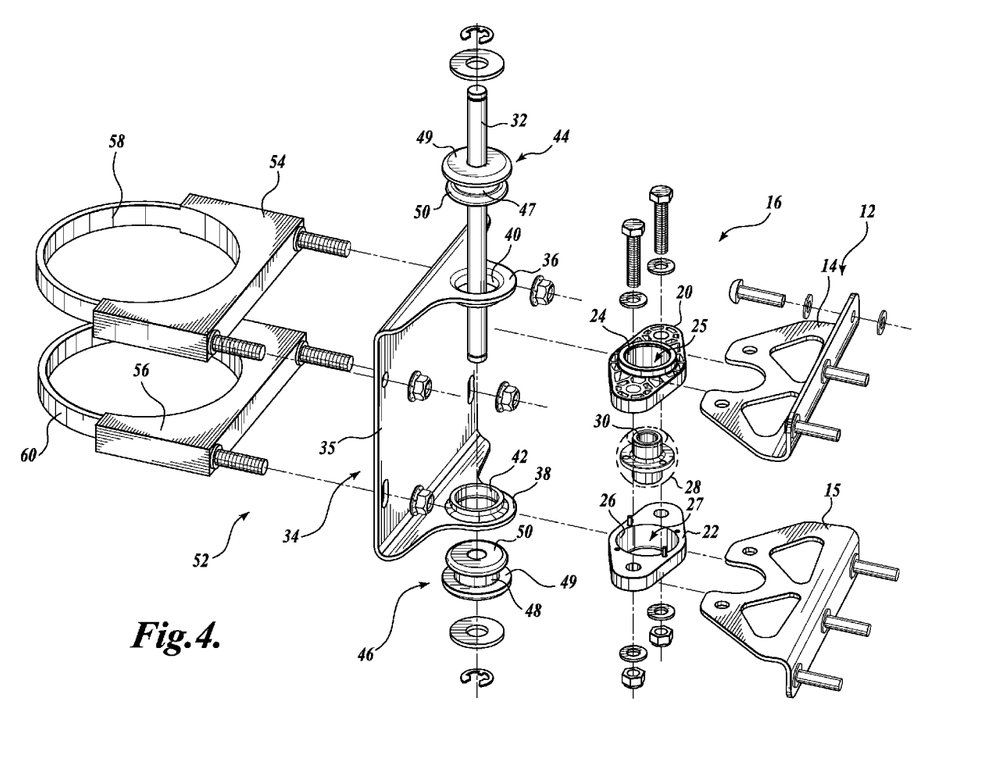
FIG. 4 is an exploded view of the exhaust damper of FIG. 3.

Referring to FIG. 4, the vehicle mount assembly 12 includes an upper mount bracket 14 and a lower mount bracket 15 disposed in a spaced parallel relationship to each other. The upper and lower mount brackets 14 and 15 are mounted to the vehicle cab A such that they extend outwardly and substantially orthogonally from the cab A (See FIG. 2). Both the upper and lower mount brackets 14 and 15 are mountable to the cab A with any suitable fastener, such as a nail, screw, or bolt.

The vehicle mount assembly 12 further includes a pivot assembly, or spherical mount bushing assembly 16 disposed between the upper and lower mount brackets 14 and 15. The spherical mount bushing assembly 16 includes a rigid upper spherical mount bushing 20 mountable to the bottom surface of the upper mount bracket 14 and a rigid lower spherical mount bushing 22 mountable to the upper surface of the lower mount bracket 15. The upper and lower spherical mount bushings 20 and 22 are coupled together to define the housing of the spherical mount bushing assembly 16. The rigid upper and lower spherical mount bushings 20 and 22 are preferably made from a hard, low-friction material, such as Delrin®, or another acetyl copolymer or low-friction material.

The upper and lower spherical mount bushings 20 and 22 include upper and lower spherical races 24 and 26 formed therewithin, respectively. When the upper and lower spherical mount bushings 20 and 22 are coupled together, the upper and lower spherical races 24 and 26 cooperatively define an interior spherical opening 18 (shown in cross-section in FIG. 7). A first circular opening 25 is formed within the top surface of the upper spherical mount bushing 20, wherein the first circular opening 25 is in communication with the upper spherical race 24. Similarly, a second circular opening 27 is formed within the bottom surface of the lower spherical mount bushing 22, wherein the second circular opening 27 is in communication with the lower spherical race 26.

A ball bushing 28 is rotatably received between the upper and lower spherical mount bushings 20 and 22 in the interior spherical opening 18 defined by upper and lower spherical races 24 and 26. The ball bushing 28 includes a bore, or plain bearing 30 formed or encapsulated therewithin. The plain bearing 30 extends through the ball bushing 28 such that two openings are formed diametrically opposite one another within the ball bushing 28. The ball bushing 28 is received within the upper and lower spherical mount bushings 20 and 22 such that a portion of the ball bushing 28 projects through the first and second circular openings 25 and 27 of the upper and lower spherical mount bushings 20 and 22. The ball bushing 28 is positioned within the upper and lower spherical mount bushings 20 and 22 such that the openings defined by the plain bearing 30 are within the first and second circular openings 25 and 27.

With the upper and lower spherical mount bushings 20 and 22 coupled together and the ball bushing 28 received therewithin, the upper mount bracket 14 is positioned above the upper spherical mount bushing 20 and the lower mount bracket 15 is positioned below the lower spherical mount bushing 22. The upper mount bracket 14 includes an opening formed therewithin, and the upper spherical mount bushing 20 is positioned beneath the upper mount bracket 14 such that the first circular opening 25 of the upper spherical mount bushing 20 remains exposed. The lower mount bracket 15 similarly includes an opening formed therewithin, and the lower spherical mount bushing 22 is positioned above the lower mount bracket 15 such that the second circular opening 27 of the lower spherical mount bushing 22 remains exposed. The upper and lower mount brackets 14 and 15 are coupled together with the spherical mount bushing assembly 16 sandwiched therebetween by passing any suitable fastener through the brackets 14 and 15 and the mount bushings 20 and 22.

Referring still to FIG. 4, an isolation pin 32 is slidably and rotatably received within the plain bearing 30 of the ball bushing 28. The plain bearing 30 is preferably made of any suitable low-friction material, such as UHMW polyethylene, Delrin®, or Nylatron®, such that it may slide and rotate freely on the isolation pin 32. The isolation pin 32 is also rotatable within the spherical mount bushing assembly 16 through the movement of the ball bushing 28 within the upper and lower spherical mount bushings 20 and 22.

Referring to FIGS. 3 and 4, each end of the isolation pin 32 is received within the exhaust member mount assembly 52 to couple the vehicle mount assembly 12 to the exhaust member mount assembly 52. The exhaust member mount assembly 52 includes an isolation bracket 34 that is generally U-shaped in cross-section. The isolation bracket 34 includes a main body portion 35 and upper and lower transverse projections 36 and 38 extending outwardly and substantially orthogonally from the upper and lower ends of the main body portion 35. The upper transverse projection 36 includes an opening formed therewithin that defines an upper bushing 40, and the lower transverse projection 38 includes an opening formed therewithin that defines a lower bushing 42.

The upper bushing 40 receives an upper resilient member, or damper bushing 44, and the lower bushing 42 receives a lower resilient member, or damper bushing 46. The upper and lower damper bushings 44 and 46 include first and second annular recesses 47 and 48 formed therewithin. The first and second annular recesses 47 and 48 define first and second circular portions 49 and 50 on each damper bushing 44 and 46. The annular recesses 47 and 48 substantially conform in size and shape to the upper and lower bushings 40 and 42. In this manner, the upper and lower damper bushings 44 and 46 are press fit into the upper and lower bushings 40 and 42, respectively, with the first and second circular portions 49 and 50 protruding outwardly from the upper and lower bushings 40 and 42.

Both upper and lower damper bushings 44 and 46 include through-holes formed along the central axis of each bushing 44, 46. The through-holes are sized and shaped to tightly receive the isolation pin 32 therewithin, as described in more detail below. The upper and lower damper bushings 44 and 46 are preferably made from a deformable material that has good vibration dampening characteristics and is sufficiently durable to consistently return to its original shape after minor deformations.

The exhaust member mount assembly 52 further includes first and second exhaust member mounting brackets 54 and 56. The first and second exhaust member mounting brackets 54 and 56 are generally rectangular in shape with a semicircular recess formed in each bracket along one of the elongated edges. Each exhaust member mounting bracket 54, 56 includes a through hole (not shown) positioned on each side of the semicircular recess that pass from one elongated edge of the exhaust member mounting bracket 54, 56 to the other elongated edge. The through-holes of the first exhaust member mounting bracket 54 are sized to receive the ends of a U-bolt 58, and the through-holes of the second exhaust member mounting bracket 56 are sized to receive the ends of a U-bolt 60.

To couple the exhaust member mount assembly 52 to the exhaust stack F, the first and second exhaust member mounting brackets 54 and 56 are positioned adjacent the exhaust stack F such that the semicircular recess of the first and second exhaust member mounting brackets 54 and 56 engage the exhaust stack F. Thereafter, the first and second U-bolts 58 and 60 engage the exhaust stack F opposite the first and second exhaust member mounting brackets 54 and 56 to enclose the exhaust stack F between the U-bolts 58 and 60 and the exhaust member mounting brackets 54 and 56. The ends of the U-bolts 58 and 60 are received within the through holes of the exhaust member mounting brackets 54 and 56.

The U-bolts 58 and 60 include threaded portions at both ends which protrude out of the through holes of the exhaust member mounting brackets 54 and 56. The threaded portions of the U-bolts 58 and 60 are received within apertures formed in the main portion 35 of the isolation bracket 34. A washer and nut are thereafter secured to the end of the threaded projections to couple the isolation bracket 34 to the exhaust stack F.

It should be appreciated that the isolation bracket 34 may instead be coupled to the exhaust stack F using other means. For instance, a single bracket and U-bolt may instead be used to mount the isolation bracket 34 to the exhaust stack F. Moreover, a belt or other flexible element may also be used, wherein the belt passes around both the exhaust stack F and the isolation bracket 34 to couple the bracket 34 to the exhaust stack F.

Still referring to FIGS. 3 and 4, the isolation pin 32 passes through both the isolation bracket 34 and the spherical mount bushing assembly 16 to couple the exhaust member mount assembly 52 to the vehicle mount assembly 12. The isolation pin 32 is received within the through-hole in either the upper or lower damper bushings 44 or 46, thereafter within the bore defined by the plain bearing 30, and then within the through-hole of the other of the upper or lower damper bushings 44 or 46. A clip or other fastener may be secured to each end of the isolation pin 32 after it has passed through the upper damper bushing 44, the spherical mount bushing assembly 16, and the lower damper bushing 46 to secure the isolation pin 32 therewithin.

As described with respect to FIG. 1, the exhaust stack F is coupled to the truck frame through the engine exhaust pipe C, and it is coupled to the truck cab A through the exhaust damper 10. When cab A is movably suspended upon the frame of the vehicle while the vehicle is in motion, the exhaust stack F and the cab A necessarily move independently. The exhaust damper 10 allows the exhaust stack F to be coupled to the cab A without substantially restricting the motion of the cab A relative to the truck frame as described below in more detail.

Figure 5:
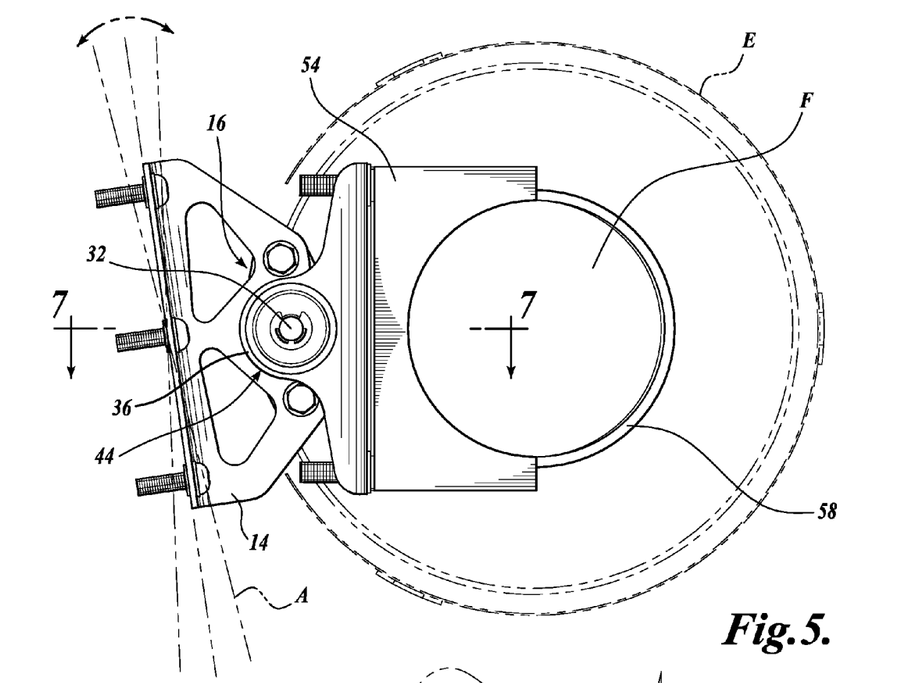
FIG. 5 is a top view of the exhaust damper of FIG. 3, with a vertical exhaust system and a vehicle cab shown in phantom.
Figure 6:
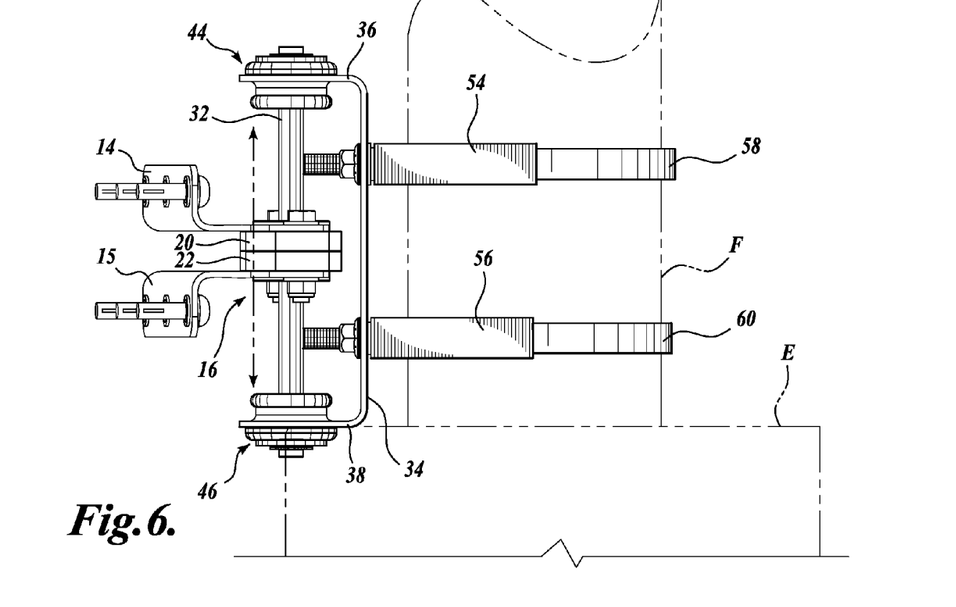
FIG. 6 is a side view of the exhaust damper of FIG. 3, with a vertical exhaust system and a vehicle cab shown in phantom.
Figure 7:
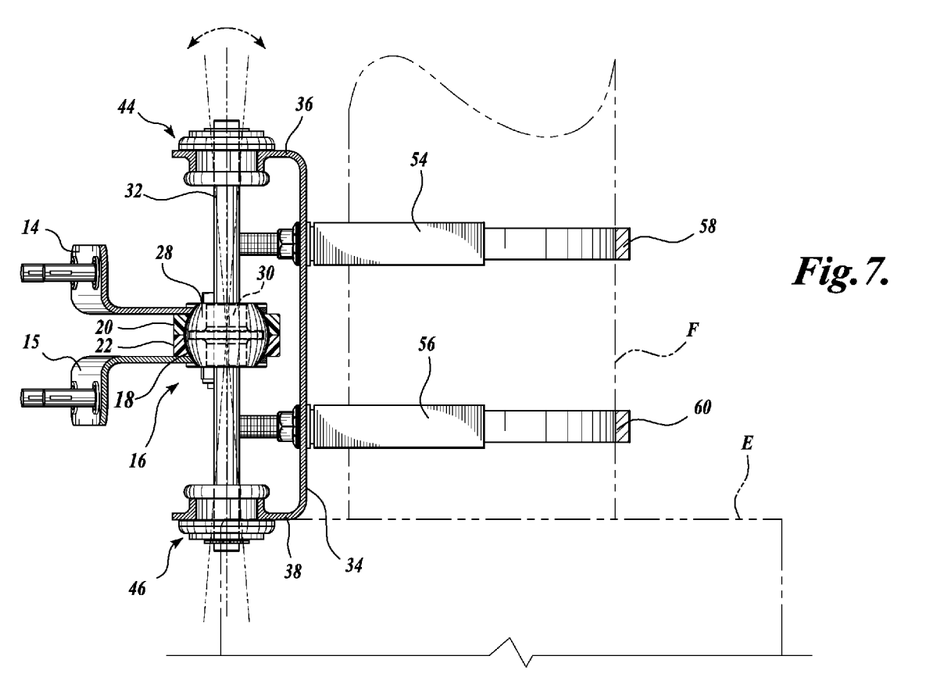
FIG. 7 is a partial cross-sectional view of the exhaust damper of FIG. 5 taken substantially across lines 7-7, with a vertical exhaust system and a vehicle cab shown in phantom.

Referring to FIGS. 5 and 6, the exhaust damper 10 allows the exhaust stack F and cab A to move independently of each other about the longitudinal axis defined by the isolation pin 32. For instance, when the cab A translates about the isolation pin 32, the upper and lower mount brackets 14 and 15 and the upper and lower spherical mount bushings 20 and 22 also translate about the isolation pin 32 with the cab A, as depicted in FIG. 5. Referring to FIGS. 6 and 7, as the spherical mount bushing assembly 16 and upper and lower mount brackets 14 and 15 move, the spherical mount bushings 20 and 22 translate about the ball bushing 28 and the isolation pin 32. Moreover, the isolation pin 32 rotates within the plain bearing 30, allowing the exhaust member mount assembly 52 to move independently. In this manner, the cab A moves independently of the exhaust stack F.

Referring to FIGS. 6 and 7, exhaust damper 10 also allows the cab A and exhaust stack F to move vertically independent of each other. When the truck cab A and the upper and lower mount brackets 14 and 15 move vertically, they translate along the isolation pin 32 through the plain bearing 30. Likewise, if the exhaust stack F and the exhaust member mount assembly 52 translate vertically, they move vertically with the isolation pin 32, which moves axially through the plain bearing 30 to freely accommodate any vertical displacement between the exhaust stack F and the cab A.

Referring to FIG. 7, the exhaust damper 10 enables the cab A and exhaust stack F to rotate independently of each other about the center of the ball bushing 28. For instance, when the cab A rotates about the center of the ball bushing 28, the upper and lower mount brackets 14 and 15 and the upper and lower spherical mount bushings 20 and 22 also rotate about the center of the ball bushing 28. Moreover, the ball bushing 28 rotates within the upper and lower spherical mount bushings 20 and 22 to allow the isolation pin 32 to rotate, thereby allowing the exhaust member mount assembly 52 and the exhaust stack F to rotate independently of the cab A about the center of the ball bushing 28.

Referring to FIGS. 6 and 7, the exhaust damper 10 also substantially isolates the vibrations of the exhaust stack F and the cab A. The upper and lower damper bushings 44 and 46 disposed between the isolation pin 32 and the isolation bracket 34 substantially dampen the vibrations originating from the exhaust stack F or the cab A. The components of the exhaust damper 10 are therefore exposed to less stress when the cab A and exhaust stack F generate noise and vibrations.

While illustrative embodiments have been illustrated and described, it will be appreciated that various changes can be made therein without departing from the spirit and scope of the invention. For instance, any suitable pivot assembly that allows the cab A and exhaust stack F to rotate and move vertically independent of each other may be used without departing from the spirit and scope of the present disclosure.

The invention claimed is:

1. An exhaust system support assembly for coupling an exhaust member to a vehicle, comprising:
    (a) an exhaust member mount assembly couplable to the exhaust member;
    (b) an isolation pin received within at least a portion of the exhaust member mount assembly;
    (c) at least one resilient member disposed between the exhaust member mount assembly and the isolation pin; and
    (d) a pivot assembly couplable to the vehicle, wherein the pivot assembly is configured to slidably, pivotally, and rotatably receive the isolation pin.

2. The exhaust system support assembly of claim 1, wherein the pivot assembly is a bushing assembly.

3. The exhaust system support assembly of claim 2, wherein the bushing assembly comprises:
    (a) upper and lower spherical mount bushings; and
    (b) a ball bushing rotatably disposed between the upper and lower spherical mount bushings.

4. The exhaust system support assembly of claim 3, wherein ball bushing includes a plain bearing formed therewithin, and the isolation pin is slidably and rotatably received within the plain bearing.

5. The exhaust system support assembly of claim 1, wherein the exhaust member mount assembly comprises:
    (a) at least one exhaust member mounting bracket engageable with the exhaust member;
    (b) at least one U-bolt couplable to the exhaust member mounting bracket, wherein the exhaust member is disposable between the exhaust member mounting bracket and the U-bolt; and
    (c) an isolation bracket coupled to the at least one U-bolt, the isolation bracket receiving at least a portion of the isolation pin.

6. The exhaust system support assembly of claim 5, wherein the isolation bracket includes first and second transverse projections, the isolation pin passing through the first and second transverse projections.

7. The exhaust system support assembly of claim 6, wherein a first resilient member is disposed between the first transverse projection of the isolation bracket and the isolation pin and wherein a second resilient member is disposed between the second transverse projection of the isolation bracket and the isolation pin.

8. The exhaust system support assembly of claim 1, further comprising upper and lower mount brackets couplable to the vehicle, wherein the pivot assembly is disposed between the upper and lower mount brackets for coupling the pivot assembly to the vehicle.

9. The exhaust system support assembly of claim 1, wherein at least one resilient member is a spherical damper bushing.

10. An exhaust system support assembly for coupling an exhaust member to a vehicle, comprising:
(a) an exhaust member mount assembly, comprising:
(i) at least one exhaust member mount bracket engageable with the exhaust member;
(ii) at least one U-bolt couplable to the exhaust member mounting bracket, wherein the exhaust member is disposable between the exhaust member mounting bracket and the U-bolt; and
(iii) an isolation bracket coupled to the at least one U-bolt, the isolation bracket having first and second transverse projections;
(b) an isolation pin passing through the first and second transverse projections of the isolation bracket;
(c) a first resilient member disposed between the first transverse projection of the isolation bracket and the isolation pin and a second resilient member disposed between the second transverse projection of the isolation bracket and the isolation pin; and
(d) a pivot assembly couplable to the vehicle, wherein the pivot assembly slidably, pivotally, and rotatably receives the isolation pin, wherein the pivot assembly includes a ball bushing.

11. The exhaust system support assembly of claim 10, wherein the pivot assembly is a bushing assembly.

12. The exhaust system support assembly of claim 11, wherein the bushing assembly comprises:
(a) upper and lower spherical mount bushings; and
(b) wherein the ball bushing is rotatably disposed between the upper and lower spherical mount bushings.

13. The exhaust system support assembly of claim 3, wherein ball bushing includes a plain bearing formed therewithin, and the isolation pin is slidably and rotatably received within the plain bearing.

14. The exhaust system support assembly of claim 10, further comprising upper and lower mount brackets coupled to the vehicle, wherein the pivot assembly is disposed between the upper and lower mount brackets for coupling the pivot assembly to the vehicle.

15. The exhaust system support assembly of claim 10, wherein the first and second resilient members are spherical damper bushings.

16. An exhaust system support assembly for coupling an exhaust member to a vehicle, comprising:
(a) an exhaust member mount assembly couplable to the exhaust member;
(b) an isolation pin received within at least a portion of the exhaust member mount assembly;
(c) means for substantially dampening the vibrations of either the exhaust member or the vehicle; and
(d) means for pivotally and slidably disposing the isolation pin between the exhaust member mount assembly and the vehicle.

17. The exhaust system support assembly of claim 16, wherein the means for pivotally and slidably disposing the isolation pin between the exhaust member mount assembly and the vehicle comprises a bushing assembly coupled to the vehicle, wherein the bushing assembly pivotally and slidably receives the isolation pin.

18. The exhaust system support assembly of claim 17, further comprising upper and lower mount brackets coupled to the vehicle, wherein the bushing assembly is disposed between the upper and lower mount brackets.

19. The exhaust system support assembly of claim 17, wherein the bushing assembly comprises:
(a) upper and lower spherical mount bushings; and
(b) a ball bushing rotatably disposed between the upper and lower spherical mount bushings.

20. The exhaust system support assembly of claim 18, wherein the ball bushing includes a plain bearing formed therewithin, and the isolation pin is slidably and rotatably received within the plain bearing.

21. The exhaust system support assembly of claim 16, wherein the means for substantially dampening the vibrations of either the exhaust member or the vehicle comprises at least one resilient member disposed between the isolation pin and the exhaust member mount assembly.

22. The exhaust system support assembly of claim 21, wherein the exhaust member mount assembly comprises:
(a) at least one exhaust member mounting bracket engageable with the exhaust member;
(b) at least one U-bolt couplable to the exhaust member mounting bracket, wherein the exhaust member is disposable between the exhaust member mounting bracket and the U-bolt; and
(c) an isolation bracket couplable to the at least one U-bolt, the isolation bracket receiving at least a portion of the isolation pin.

23. The exhaust system support assembly of claim 22, wherein the isolation bracket includes first and second transverse projections, the isolation pin passing through the first and second transverse projections.

24. The exhaust system support assembly of claim 23, wherein a first resilient member is disposed between the first transverse projection of the isolation bracket and the isolation pin and a second resilient member is disposed between the second transverse projection of the isolation bracket and the isolation pin.

25. The exhaust system support assembly of claim 24, wherein the at least one resilient member is a spherical damper bushing.

26. The exhaust system support assembly of claim 6, wherein the pivot assembly is disposed between the first and second transverse projections.

27. The exhaust system support assembly of claim 10, wherein the pivot assembly is disposed between the first and second transverse projections.

28. The exhaust system support assembly of claim 23, wherein the pivot assembly is disposed between the first and second transverse projections.

* * * * *

UNITED STATES PATENT AND TRADEMARK OFFICE
CERTIFICATE OF CORRECTION

PATENT NO. : 7,678,168 B2 Page 1 of 1
APPLICATION NO. : 11/610929
DATED : March 16, 2010
INVENTOR(S) : W. R. Connelly et al.

It is certified that error appears in the above-identified patent and that said Letters Patent is hereby corrected as shown below:

| COLUMN | LINE | ERROR |
|---|---|---|
| (73) | Assignee | "PACCAR Inc.," should read |
| Pg. 1, col. 1 | | --PACCAR Inc,-- |

Signed and Sealed this

Twenty-ninth Day of June, 2010

David J. Kappos
*Director of the United States Patent and Trademark Office*